May 8, 1956 J. A. GREEFKES ET AL 2,744,959

PULSE-CODE MODULATION TRANSMITTER

Filed April 14, 1951 2 Sheets-Sheet 1

INVENTORS.
JOHANNES ANTON GREEFKES
FRANK DE JAGER
PIET VAN TILBURG
BY
AGENT.

INVENTORS.
JOHANNES ANTON GREEFKES
FRANK DE JAGER
PIET VAN TILBURG.
BY
AGENT.

2,744,959
Patented May 8, 1956

2,744,959

PULSE-CODE MODULATION TRANSMITTER

Johannes Anton Greefkes, Frank de Jager, and Piet van Tilburg, Eindhoven, Netherlands, assignors to Hartford National Bank and Trust Company, Hartford, Conn., as trustee Application April 14, 1951, Serial No. 221,023
Claims priority, application Netherlands May 17, 1950
7 Claims. (Cl. 179—15)

Figure 1:
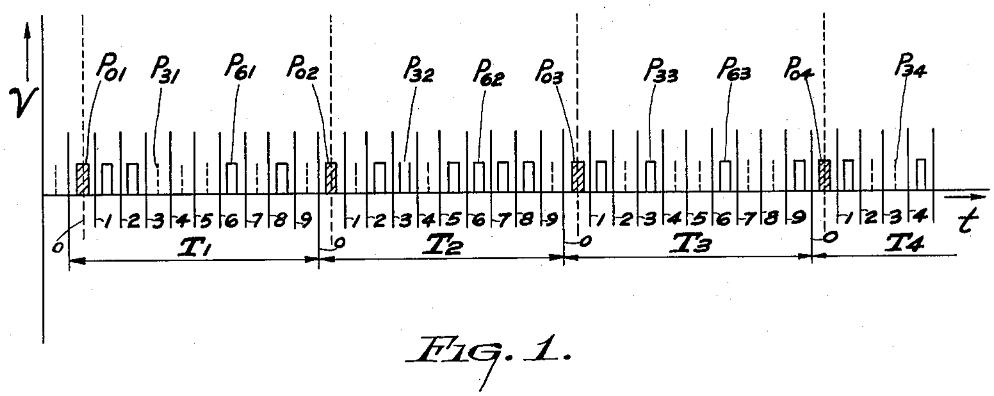

The invention relates to transmitters for the transmission of signals by means of pulse-code modulation, use being made of synchronizing pulses and signalling pulses, each signal cycle comprising a synchronization interval and a plurality of signal intervals occurring in cyclic order of succession, within which signal pulses are present or absent in accordance with the signals to be transmitted, all the emitted pulses being equal to one another and coinciding with different pulses of a sequence of equidistant pulses.

The combined use of time and amplitude quantisation are characteristics of pulse-code modulation.

Time quantisation is effected in that pulses are taken from the pulse-code modulator which coincide with pulses of a sequence of equidistant pulses. On the receiver side transmission errors introduced by time shifts by the incoming pulses can thus be substantially eliminated by the use of pulse regenerators, which may be preceded, if necessary, by amplitude-threshold and amplitude-limiting devices. Particularly with the transmission of signals via a plurality of relay transmitters this is of a particular advantage, which is not found with other kinds of pulse modulation, for example, pulse position modulation. Use may furthermore be made of time quantisation to minimize cross-talk between different channels with the transmission of a plurality of signals in time division.

Whereas in other conventional modulation systems each instantaneous value of the signal lying within certain limits but otherwise being arbitrary, can be transmitted, only a restricted number of amplitude levels can be transmitted with the use of amplitude quantisation. Thus, for example, radio transmitters are known for the transmission of intelligence signals by pulse-code modulation, use being made for example of a binary 5-digit code, in which 32 different amplitude levels can be characterized. The transmitted signal is, this case, sampled at equidistant instants with a recurrence frequency (signal cycle frequency) which is about twice the maximum signal frequency to be transmitted and may, for example, be 8 kc./s. for a maximum signal frequency of 3.4 kc./s. Instead of transmitting the instantaneous values of the signal occurring at equidistant instants, the nearest of the 32 transmissible amplitude levels is each time transmitted in a particular manner, since the level to be transmitted is coded in a code-pulse group modulator, i. e. with the use of a 5-digit code a code-pulse group characteristic of this level and composed of 5 equal and equidistant pulses is produced and emitted. In this case the signal pulses each occur within an individual signal interval. The presence or absence of one or more pulses of a code-pulse group characterizes the amplitude level and hence approximately the instantaneous value of the signal.

Apart from the aforesaid kind of transmitters for pulse-code modulation, transmitters comprising pulse-code modulators based on similar principles have been suggested, in which the signals to be transmitted control a pulse modulator connected to an equidistant pulse generator, the pulse modulator being shunted by a return circuit with a pulse-code demodulator, the return circuit comprising the series connection of a signal-frequencies integrating network and a difference producer also controlled by the signals to be transmitted. Across the difference producer occurs a return voltage which constitutes a quantised approximation of the signal to be transmitted and which, if shown in a time diagram, alternates about the input signal. According as the instantaneous value of the return voltage is higher or lower than that of the signal to be transmitted, a positive or negative difference voltage is produced across the output circuit of the difference producer. Under the control of the polarity of this difference voltage, or of a voltage derived therefrom, the pulses initiating from the pulse generator are transmitted by the pulse modulator to the output circuit of the pulse-code modulator or suppressed. (See U. S. Patent No. 2,662,118, issued December 8, 1953.) With the simultaneous transmission of a plurality of signals in time division as described above, a synchronizing pulse can be emitted every second signal cycle to provide synchronisation of the receiver.

As an alternative, the said pulse-code modulators having a return circuit may be constructed in a manner (see, U. S. Patent No. 2,662,113, issued December 8, 1953) such that by means of a preferably binary pulse-group code the quantized instantaneous value of the difference voltage or a voltage derived therefrom is reproduced (see the copending U. S. application, Serial No. 216,486, filed March 20, 1951). When using the last-mentioned pulse-code modulators having a return circuit not only in time-division transmission but also in the transmission of a single intelligence signal, synchronizing pulses must be emitted.

In pulse-code modulators having a return circuit, the emission of synchronizing pulses in the manner described above may give rise to difficulties in practice; for example, with pulse-code modulators having a return circuit for the transmission of signals in a 1-digit code in the absence of an intelligence signal, for example in an intelligence interval, half the signal-cycle frequency may occur in a pronounced manner in the pulse sequence emitted in corresponding signal intervals. The receiver synchronisation could respond to this, as if this intelligence signal were the synchronisation channel.

The object of the invention is to provide a pulse-code modulation transmitter providing improved synchronizing facilities.

According to the invention, owing to the emission of a synchronizing pulse in the synchronization interval of each signal cycle, the recurrence frequency of the synchronizing pulses is equal to the signal cycle frequency, whereas for signalling purposes in a signal channel all the signal pulses of the signal pulse intervals associated with this channel are suppressed for the duration of the signalling pulses.

If signal pulses in a definite signal interval are present or absent in each of those signal intervals, for example, for ¼ to 1 second, the operational condition of the pulse-code modulation transmitter is abnormal and hence impermissible.

With such constant presence of signal pulses in a given signal interval, the signal channel concerned is preferably put out of circuit automatically by means of a monitoring relay, which, upon responding, cuts off the signal pulse output of the intelligence channel concerned and, for example, at the same time causes an alarm device to become operative. Hence a signal channel is prevented from taking over the function of a synchronization channel.

From the signalling point of view it is not of importance that for a period of, for example, 40 to 60 msec., the signal pulses are constantly emitted or suppressed in a definite signal interval; however, the emission of the signal pulses for 40 to 60 msec. could affect the synchronization at the receiver side, which is not the case with signalling by suppressing of signal pulses.

If the signal pulses are continuously absent in a definite signal interval, for example, for ¼ to 1 sec., the signal channel concerned may automatically be put out of operation in a manner exactly similar to the case of a definite signal interval in which signal pulses are constantly present.

When the invention is carried out on the transmitter side, the determination of the synchronising intervals at the receiver side and the maintenance of the synchronization of the receiver may be effected in a manner known per se or alternatively, for example, in the manner described in the copending U. S. application, Serial No. 221,022, filed April 14, 1951.

Figure 2:
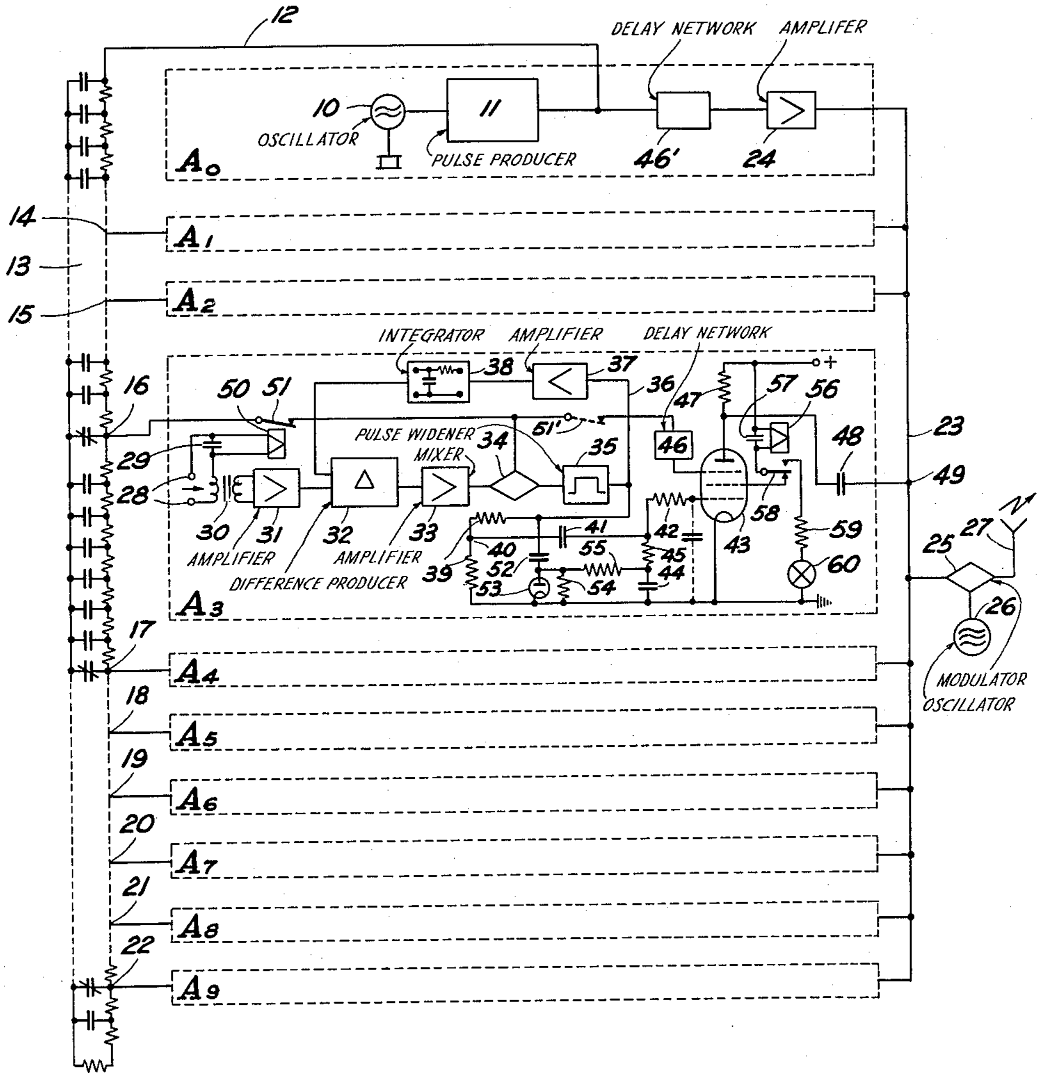

In order that the invention may be more clearly understood and readily carried into effect, it will now be described more fully with reference to the accompanying diagrammatic drawing, given by way of example, in which:

Fig. 1 shows a time diagram of pulses emitted by a 9+1 channel multiplex transmitter according to the invention with the transmission of signals with the use of a 1-digit code, and Fig. 2 shows, in part in a block diagram, one embodiment of said transmitter.

In the time diagram shown in Fig. 1, successive signal cycles $T_1$, $T_2$, $T_3$ and $T_4$ and so on are each subdivided into 10 intervals of equal size. The first intervals 0 (shown shaded) are for synchronization pulses $P_{01}$, $P_{02}$, $P_{03}$, $P_{04}$, and so on. The other intervals in each signal cycle are successively numbered from 1 to 9 and are intended for pulses associated with 9 different signalling channels. Thus pulses $P_{31}$, $P_{32}$, $P_{33}$ and $P_{34}$ are associated with the third signal channel; it should be noted here that the pulses $P_{31}$ and $P_{34}$ are suppressed and therefore indicated by a broken line. Pulses $P_{61}$, $P_{62}$ and $P_{63}$ associated with the sixth signal channel are indicated in a similar manner. The latter signal pulses are present in each of the three signal cycles $T_1$, $T_2$ and $T_3$. The shape duration and amplitude of the signal pulses and synchronizing pulses are identical. The synchronizing pulses are however always present, i. e. each signal cycle contains a synchronizing pulse in the time interval 0. Pulses associated with a definite signal chanel, for example the pulses associated with the third or the sixth signal channel, $P_{31}$ to $P_{34}$ or $P_{61}$ to $P_{63}$ respectively are present and absent in accordance with the signal to be transmitted in the channel concerned. If a signal pulse is always present in the signal interval associated with one of the channels, an abnormal operational condition exists and the signal channel concerned is required to be made inoperative, for example, after the signal pulse has been present in 35,000 successive signal cycles, in order to prevent this signal channel from taking over the function of the synchronization channel.

In the pulse series shown all the emitted pulses coincide with pulses of a sequence of equidistant pulses. The recurrence frequency of the synchronizing pulses and the signal cycle frequency may, for example, be 50 kc./s. and the duration of each emitted pulse may be 1 $\mu$sec.

The transmitter shown in Fig. 2 comprises a single synchronization channel $A_0$ and 9 signal channels $A_1$ to $A_9$. Channel $A_3$ is shown in greater detail than the other signal channels which are constructed in an exactly similar manner.

The synchronization channel $A_0$ comprises a crystal-controlled oscillator 10 and a pulse producer 11 connected thereto, which supplies pulses of 1 $\mu$sec. with a recurrence frequency of 50 kc./s. The pulses are fed to a pulse amplifier 24 and, moreover, via a line 12, to a delay line 13, which is composed of a great number of inductor-capacitor sections. Each signal channel is connected to one of nine successive tappings 14 to 22 of this delay line, in a manner such that a pulse is supplied to different signal channels in the individual time intervals of these channels. In accordance with the signals to be transmitted in the various channels, these pulses are allowed to pass through or are suppressed in the signal channels. The outputs of the signal channels are all connected in parallel by means of a line 23, to which also the output circuit of the pulse amplifier 24 included in the synchronization channel is connected. The pulses taken from the various channels occur in succession, as is shown in Fig. 1 and are fed to further transmitting devices, which are, for example, constituted by a modulator 25, a carrier-wave oscillator 26 and an aerial 27.

Now follows a description of the circuit diagram of the signal channel $A_3$. The signals and signalling pulses, in the present case direct-current signalling pulses, to be transmitted in this channel are supplied to input terminals 28, to which a blocking capacitor 29 and a signal input transformer 30 are connected. The signals to be transmitted control, via the input transformer 30, a low-frequency amplifier 31 and are supplied, subsequent to amplification, to a difference producer 32, the output voltage of which is supplied to a mixer 34, via a direct-current amplifier 33, to this mixer being furthermore supplied the pulses initiating from tapping 16 of the delay line. The mixer 34 is so biassed that pulses from tapping 16 are only transmitted if the output voltage of the difference produce 34 is positive in polarity. Consequently, at negative polarity of this difference voltage no pulses occur across the output circuit of the mixer 34. The output circuit of the mixer 34 is connected to the input circuit of a pulse generator 35, which supplies a widened pulse, each time a pulse is fed thereto, and which then returns to its initial condition (flip-flop circuit). The widened pulses are supplied via a line 36 to a return circuit comprising a pulse amplifier 37 and a signal-frequencies integrating network 38. The output voltage of the integrating network 38, as well as the signal to be transmitted and suplied from the amplifier 31, are supplied to the difference producer 32, which supplies an output voltage of negative polarity if the instantaneous value of the output voltage of the integrating network 38 exceeds the instantaneous value of the signal voltage; in the opposite case, the difference producer 32 supplies an output voltage of positive polarity in which case the mixer 34 transmits the pulse from the delay line to the pulse widener 35, the output pulse of which causes the output voltage of the integrating network 38 to increase by a definite value. If this increase in output voltage of the integrating network is not sufficient to render the polarity of the output voltage of the difference producer negative, the output voltage of the integrating network 38 will increase again, when the next following pulse arrives from the delay line 13, until the output voltage has substantially the same value as the signal voltage supplied to the difference producer 32. This results in that the output voltage of the integrating network 38 follows the signal voltage of the amplifier 31, so that the pulses from the pulse widener 35 characterize the signal voltage.

The pulses occurring across the output circuit of the pulse widener 35 are supplied not only to the return circuit but also to a potentiometer 39. A tapping 40 of this potentiometer is connected, via a capacitor 41 and a small series resistor 42, to the control-grid of a pentode 43, which is normally cut off, inter alia by a grid bias voltage occurring across a capacitor 44 included in the control-grid circuit. One end of the capacitor 44 is connected to the earthed cathode of the pentode and the other end via a series resistor 45 to the point of connection of capacitor 41 and series resistor 42.

The elements included in the control-grid circuit of the pentode 43, mentioned above, are proportioned such that the widened pulses supplied through coupling capacitor 41 to the control-grid cause the pentode to become conductive, when they occur such that a certain screen-grid voltage occurs; however, it does not result in the occurrence of anode current in the pentode unless simultaneously a positive pulse is received via a delaying network 46 from the tapping 16 of the delay line 13. Consequently, across the output resistor 47 of the pentode 43 a transient pulse occurs each time a pulse supplied from tapping 16 of the delay line 13 coincides with a pulse occurring across the output circuit of the pulse widener 35. The output pulses of the pentode 43 are supplied via coupling capacitor 48 to an output terminal 49, which is connected to the output line 23 in common to all the channels.

It will be evident from the foregoing that in the channel $A_3$ pulses supplied from tapping 16 of the delay line 13 are transmitted or suppressed in accordance with the signals to be transmitted in this channel. The transmitted pulses occur in the time interval reserved for the channel $A_3$ by a suitable choice of the delaying time of the artificial line 13 between its input and tapping 16. In a similar manner the signal pulses supplied from the other signal channels occur in their individual time intervals in the cycles. A pulse supplied from the synchronization channel $A_0$ occurs in each cycle; a delaying network 46' is included in the synchronization channels, in order to provide that all the pulses occurring across the common output line coincide with pulses of a sequence of equidistant pulses.

As stated above, not only the signals to be transmitted but also direct-current signalling pulses are supplied to the input terminals 28 of the channel $A_3$. These direct-current signally pulses produce a direct voltage across capacitor 29 for a period of, for example, from 40 to 60 msec., so that a signalling relay 50 is energized. When the signalling relay 50 is energized, the connection between the tapping 16 of the delay cable 13 and the input circuit of the mixer 34 and the delay network 46 is interrupted by the opening of a break contact 51. Then all signal pulses in the channel are suppressed for a period of, for example, from 40 to 60 msec. equalling the duration of a direct-current signal pulse.

The break contact 51 being arranged as is shown, the signalling pulse results in the interruption of the return circuit, which may have undue consequences, owing to the occurrence of great differences between signalling and return voltages. In order to avoid this, the break contact may be arranged as is indicated at 51'.

Care should be taken that no direct-current pulses of excessive duration, of, for example, from 0.2 to 0.5 sec., are supplied via the input terminals 28.

As stated above, the signal pulses can normally neither be constantly present nor absent in the channel $A_3$. The occurrence of either of these conditions denotes an abnormal condition of the signal channel concerned, in which case it is required to be put out of operation. In order to achieve this, the widened pulses 21 initiating from the pulse widener 35 are supplied via a coupling capacitor 52, which cuts off direct current, to a rectifying circuit having a diode 53, a parallel resistor 54 and a smothing filter connected thereto and comprising a series resistor 55 and the output capacitor 44. When the pulse widener 35 transmits and suppresses pulses in an alternation normally varying with the signals to be transmitted, then across the output capacitor 44 there occurs a negative grid bias voltage supplied to the control-grid of the pentode 43, which prevents the screen-grid current of the pentode 43 from assuming a high value. However, when the pulse widener 35 does not supply pulses for a considerable time, or when it does supply pulses continuously for a considerable time, the bias voltage occurring across the output capacitor 44 gradually disappears in the course of a period which varies with the values of the components 52, 54, 55 and 44. This period may, for example, be such that only when the pulse widener 35 continuously supplies or suppresses pulses for, for example, from 0.5 to 1 sec., does the output voltage across the capacitor 44 drop to substantially zero. Owing to the suppression of the negative grid bias voltage, the screen-grid current of the pentode 43 will now assume a high value, so that a monitoring relay 56 included in the screen-grid circuit responds, this relay being shunted by a capacitor 57 as far as pulses are concerned. Owing to the energization of the relay 56, a switch 58 having a change-over contact is changed over. This results in the interruption of the screen-grid voltage supply, whilst furthermore a holding circuit of the relay 56 is completed across a resistor 59 and an alarm lamp 60. The channel $A_3$ is thus put out of operation and can be put into operation again by the interruption of the holding circuit of the checking relay 56. With a view to repairing a break-down in one of these channels, it may be replaced by a spare channel.

In the foregoing only the channel $A_3$ is described; the other channels $A_1$, $A_2$ and $A_4$ to $A_9$ may be constructed in an exactly similar manner and may be interchangeable.

It will be obvious that the invention may also be used with the transmission of signals by pulse-code modulation performed in a different manner, for example, the pulse modulator in the channel $A_3$ shown in Fig. 2 may be constructed so that instead of characterizing a difference voltage by means of a 1-digit code, it is characterized by means of a multi-digit code, for example, a 3-digit code. In such a case a monitoring device as shown in Fig. 2 will, in general, be sufficient and it will then not be necessary to supervise separately the three signal intervals associated with the channel concerned.

What we claim is:

1. A transmitter for emitting in time-multiplex pulse-code modulation signals, comprising a synchronization pulse generator, a plurality of signal channels, means to supply an operating pulse and a channel signal to the input of each channel to produce a signal pulse which may be present or absent as a function of the channel signal ot be emitted, and means to emit cyclically at a predetermined rate a synchronizing pulse from said generator and a signal pulse from each of said channels, each cycle being constituted by a sequence of intervals during one of which the synchronizing pulse is emitted and during the remainder of which the present or absent signal pulses from the respective channels are meitted, said emitted pulses being substantially equal and coinciding in time position with respective pulses of a series of equidistant pulses, and means to supply signalling pulses to the input of each channel, each of said channels further including means responsive to said signalling pulses for suppressing all the signal pulses in the signal pulse intervals associated therewith for the duration of said signalling pulses.

2. A transmitter as claimed in claim 1, in which each said signal channel comprises a signalling relay connected to receive said signalling pulses and suppress the signal pulses in said signal channel in response to the occurrence of said signalling pulses.

3. A transmitter as claimed in claim 1, in which each said signal channel comprises a checking relay connected to be energized when said signal pulses are continuously present in a signal interval associated with this channel, and means connected to interrupt the output circuit of a signal channel when the associated checking relay is energized.

4. A transmitter as claimed in claim 1, in which each said signal channel comprises a checking relay connected to be energized when said signal pulses are continuously absent in a signal interval associated with this channel, and means connected to interrupt the output circuit of a signal channel when the associated checking relay is energized.

5. A transmitter as claimed in claim 1, in which each said signal channel comprises a checking relay having an energizing winding, a pulse modulator including a difference producer, a return circuit including an integrating network connected to shunt said pulse modulator, and a rectifier circuit coupling said energizing winding to the output circiut of said pulse modulator.

6. A transmitter as claimed in claim 1, further including a pulse widener connected to the output circuit of said pulse modulator, and an amplifier including a pentode electron discharge tube normally biased to cut off and having a control grid, a screen grid, a suppressor grid and an anode, means connecting said control grid to the output of said pulse widener, a rectifier connected by means which blocks direct current to the output of said pulse widener, a smoothing filter connected between said rectifier and said control grid to supply the output voltage of said rectifier as a bias voltage to said control grid, a source of substitute pulses connected to said suppressor grid, an output resistor connected to said anode, a holding circuit for said checking relay, and a source of voltage for said screen grid, said checking relay having contacts normally connecting said screen grid to said screen grid voltage source and adapted to interrupt said last-named connection when said relay is energized and connect said holding circuit to said energizing winding.

7. A transmitter as claimed in claim 6, further including an alarm device connected to be controlled by said checking relay.

References Cited in the file of this patent

UNITED STATES PATENTS

| | | |
|---|---|---|
| 2,429,613 | Deloraine et al. | Oct. 28, 1947 |
| 2,489,302 | Levy | Nov. 29, 1949 |